(No Model.)

H. TABOR.
SPEED INDICATOR.

No. 325,991. Patented Sept. 8, 1885.

WITNESSES
John Becker
Jno. E. Gavin

INVENTOR
Harris Tabor
by Chas. M. Higgins
Attorney

UNITED STATES PATENT OFFICE.

HARRIS TABOR, OF NEW YORK, N. Y.

SPEED-INDICATOR.

SPECIFICATION forming part of Letters Patent No. 325,991, dated September 8, 1885.

Application filed July 13, 1885. (No model.)

*To all whom it may concern:*

Be it known that I, HARRIS TABOR, of New York, county and State of New York, have invented certain new and useful Improvements in Speed-Indicators, of which the following is a specification.

My invention relates to that class of devices employed to record or indicate the number of revolutions which a shaft or other revolving part of a machine makes in a certain time. These devices usually consist of a freely-turning spindle whose tip is made sharp and angular to engage with the end of the revolving shaft, and which spindle is provided with a worm which engages with a graduated worm-wheel over which a fixed index-point projects.

In using these devices as heretofore constructed it is difficult to cause the spindle to engage with the shaft and the indicating-wheel to start at the same instant that the hand of the watch starts from the minute or counting point, and hence more or less inaccuracy usually occurs in the use of the instrument. Now, it is the object of my invention to obviate this defect, which I accomplish by making the clutching or angular tip on the spindle which engages with the end of the shaft free to rotate or turn in the end of the spindle, but capable of being engaged with the spindle by means of clutching teeth or points between them, a spring being arranged to constantly project the clutching-tip out of engagement with the spindle, so that when the clutching-tip is inserted in the end of the revolving shaft it will engage therewith and become revolved without imparting motion to the spindle and indicating-wheel until pressure is applied to force the spindle toward the tip, when the two parts will become instantly clutched and the indicating-wheel revolved, and, on the other hand, when the pressure is relaxed the parts will become unclutched and the motion of the indicator will cease. By this means it is obvious that the time-finger and indicator may start at the same instant, and hence inaccuracies in the count will be obviated; and my invention, therefore, consists, mainly, in the features above outlined, as hereinafter fully set forth.

Figure 1:
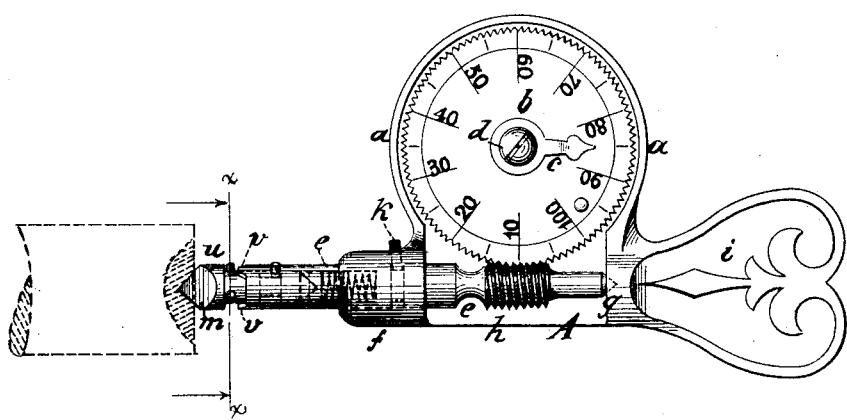
Figure 2:
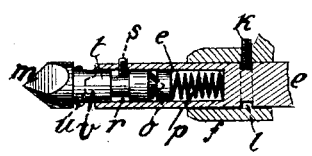
Figure 3:
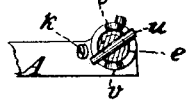

In the drawings, Figure 1 presents a full elevation of my improved speed-indicator. Fig. 2 is a longitudinal section of the tip or clutching end of the spindle, in which my invention chiefly lies. Fig. 3 is a cross-section on line $x\ x$ of Fig. 1, looking in the direction of the arrows.

In Fig. 1, A indicates the frame of the indicator instrument, which is of the usual form, having a circular rimmed wing, $a$, within which the graduated worm-wheel $b$ is pivoted, said wheel forming the indicating-dial of the instrument in connection with the fixed index-finger $c$, which projects radially from the central pivot-stud, $d$. Now, $e$ indicates the spindle of the indicator, which turns freely in the hollow hub or bearing $f$, and is stepped or centered at one end on the bearing-lug $g$, and is provided with the worm $h$ to engage the worm-wheel $b$. The frame is formed with the handle $i$ in line with the spindle, and the spindle is restrained from endwise motion in its bearings by the stop-screw $k$, which engages a groove, $l$, in the spindle, all the aforesaid features being of the usual construction.

In Figs. 1 and 2, $m$ indicates the engaging-tip of the spindle, which is usually made with a pyramidal point having sharp angular edges adapted to be inserted in the countersink in the ends of shafts and engage with the same. Heretofore, however, this tip has been made either solid and integral with the spindle or removable, but normally engaged with the spindle; but in my invention it is made independent of the spindle, being formed on a short stem, $t$, which is free to turn in a tubular socket in the end of the spindle, as well shown in Fig. 2. The inner end of the stem $t$ is preferably pointed and hardened, and rests on a bearing block or plunger, $o$, which slides freely in the tubular socket in the spindle, and is constantly pressed upon by a spring, $p$, arranged in the base of the socket, which tends to constantly project the block $o$ and the clutching-tip $m$ as far as the stop-pin $s$ will allow, said stop-pin engaging with a wide groove, $r$, in the stem $t$, which allows a certain play of the clutching-tip to and from the spindle, as will be understood. The block $o$ is hardened like the end of the stem $t$, in order to render the contact of the two durable and almost frictionless, and the block may be slightly countersunk to receive the pointed end of the stem, as illustrated in Fig. 2; or it may be flat to receive the point of the stem on its surface. Now, the tubular end of the spindle is provided with two clutch teeth or projections, $v$, and the clutching-tip is provided with a diametrical pin, $u$, which, projecting on opposite sides, forms clutching teeth or projections adapted to positively engage the teeth of the spindle when the two are forced together.

It will now be understood that, owing to the projecting action of the spring $p$, the clutch-teeth $u$ $v$ will be normally separated, and hence the tip $m$ will be free to rotate without turning the spindle $e$; hence, when it is desired to use the indicator, it is seized by the handle $i$ in the usual manner, and the angular tip $m$ is inserted in the countersink in the end of the revolving shaft, as indicated in Fig. 1. The angular edges of the tip will now engage with the shaft and it will become revolved thereby without turning the spindle $e$. Now, if the indicator-wheel does not stand at zero, the hand $c$ may be turned around to zero; or the instrument may be pressed toward the shaft, so as to compress the spring $p$ and cause the clutch-teeth $u$ $v$ to engage, which will at once cause the spindle $e$ to revolve simultaneously with the driving-shaft and the tip $m$, and the wheel $b$ will be thus revolved toward zero. When the zero-point is reached, the pressure is relaxed, which will instantly release the clutch $u$ $v$ and stop the motion of the spindle and wheel at the desired point. The operator will now hold his watch in his other hand, and when the second-hand of the watch arrives at the counting or minute point the instrument is instantly pressed toward the shaft, which will cause the clutch $u$ $v$ to engage, as before described, and thus cause the spindle $e$ and the indicating-wheel $b$ to start exactly at the commencement of the minute. When the minute or other interval of time is ended, the pressure of the hand on the instrument is relaxed, which will open the clutch $u$ $v$, and thus stop the motion of the spindle and indicating-wheel at the proper instant, and thus record the exact number of revolutions during the desired interval of time; hence by these means the revolutions of the indicator and the movement of the time-hand may be always made to start at the same point or instant, and accurate counting may be thus accomplished by an easy and simple manipulation, which renders my invention an important improvement in speed-counters.

It will be readily understood that I do not confine myself to any special construction of the clutch between the engaging tip and the spindle, as this may be greatly varied without departing from the essential features of my invention. Neither do I confine myself to any special form of indicating-gearing, which does not necessarily concern my improvement. The special form of the engaging tip $m$ may be varied to adapt it to engage different kinds of shafts or revolving parts, as is now commonly the case in devices of this class—that is, the tip may have salient angles, as shown, or may be reversed, having a similar angular recess to engage a pointed shaft, or it may be flat to abut up against a revolving surface, as my invention does not necessarily concern the shape of the tip.

What I claim is—

1. In a speed-indicator, the combination, with the tip to engage the revolving shaft or machine and a spindle or axis geared with indicating mechanism, of a clutch arranged between the tip and its spindle and capable of being thrown into and out of engagement by voluntary movements of the operator, substantially as and for the purpose set forth.

2. In a speed-indicator, the combination, with the indicating wheel or device and spindle geared thereto, of a movable engaging tip on the end of said spindle, a spring arranged to constantly project said tip, and a clutch between said tip and the end of said spindle adapted to be closed against the stress of said spring, substantially as and for the purpose set forth.

3. The combination, with the spindle $e$ and indicating-gearing driven thereby, of the tip $m$, stem $t$, projecting spring $p$, and clutch-points $u$ $v$, arranged and operating substantially as and for the purpose set forth.

4. The combination, with the spindle $e$ and indicating-gearing, of the tip $m$, stem $t$, plunger $o$, spring $p$, clutch $u$ $v$, and stop $s$, substantially as shown and described.

HARRIS TABOR.

Witnesses:
JNO. E. GAVIN,
CHAS. M. HIGGINS.